United States Patent
Bible et al.

(10) Patent No.: US 9,500,832 B2
(45) Date of Patent: Nov. 22, 2016

(54) OPTICAL FIBER STRAND AND SPLICE SLEEVE RETENTION TOOL FOR USE DURING FIBER OPTIC CABLE SPLICING

(71) Applicant: KMT INNOVATIONS LLC, Columbus, OH (US)

(72) Inventors: Kyle Wilson Bible, Galloway, OH (US); Trevor Nikles, Columbus, OH (US)

(73) Assignee: KMT Innovations LLC, Columbus, OH (US)

( * ) Notice: Subject to any disclaimer, the term of this patent is extended or adjusted under 35 U.S.C. 154(b) by 96 days.

(21) Appl. No.: 14/594,939

(22) Filed: Jan. 12, 2015

(65) Prior Publication Data

US 2015/0192740 A1   Jul. 9, 2015

Related U.S. Application Data (63) Continuation-in-part of application No. 13/974,621, filed on Aug. 23, 2013, now abandoned.

(60) Provisional application No. 61/692,900, filed on Aug. 24, 2012, provisional application No. 61/926,075, filed on Jan. 10, 2014.

(51) Int. Cl.
*G02B 6/44* (2006.01)
*G02B 6/255* (2006.01)

(52) U.S. Cl.
CPC ........... *G02B 6/4454* (2013.01); *G02B 6/2558* (2013.01)

(58) Field of Classification Search
CPC .................................................. G02B 6/4454
See application file for complete search history.

(56) References Cited

U.S. PATENT DOCUMENTS

| | | | | |
|---|---|---|---|---|
| 4,029,390 A | * | 6/1977 | Chinnock | G02B 6/25 156/158 |
| 4,254,865 A | * | 3/1981 | Pacey | G02B 6/2558 206/460 |
| 4,687,289 A | | 8/1987 | DeSanti | |
| 4,750,804 A | * | 6/1988 | Osaka | G02B 6/3652 385/137 |
| 4,753,509 A | * | 6/1988 | Parstorfer | G02B 6/4471 385/135 |
| 4,793,681 A | * | 12/1988 | Barlow | G02B 6/3801 385/135 |
| 4,854,661 A | * | 8/1989 | Cooper | G02B 6/2558 385/99 |
| 5,146,532 A | | 9/1992 | Hodge | |
| 5,155,787 A | * | 10/1992 | Carpenter | G02B 6/3636 385/137 |
| 5,668,909 A | * | 9/1997 | Mozzati | G02B 6/4447 385/134 |

(Continued)

FOREIGN PATENT DOCUMENTS

| | | | | |
|---|---|---|---|---|
| DE | EP 0216073 A1 | * | 4/1987 | ........... G02B 6/4454 |
| DE | 4104117 A1 | * | 8/1992 | ........... G02B 6/3801 |

(Continued)

*Primary Examiner* — Michelle R Connelly
(74) *Attorney, Agent, or Firm* — Standley Law Group LLP (57) ABSTRACT

An optical fiber strand holding tool is disclosed for organizing and retaining splice sleeves and fibers from a first fiber bundle during, and optionally after, a splicing activity in which the first bundle is spliced to a second fiber bundle. The apparatus and associated method provide a means of removably securing splice sleeves in an orderly fashion, preventing movement and contamination of the bare fibers during splicing. Magnets and clamping pressure are used separately or in conjunction to provide the retention force. A removable splice retaining portion permits permanent optical joint storage and protection, and reduces handling of the optical joints. Color coded splice sleeves and splice channels are employed for quick matching between fibers in fiber bundle pairs being spliced.

12 Claims, 8 Drawing Sheets

(56) References Cited

U.S. PATENT DOCUMENTS

| | | | |
|---|---|---|---|
| 6,240,236 B1* | 5/2001 | Daoud | G02B 6/3801 |
| | | | 385/136 |
| 6,353,697 B1* | 3/2002 | Daoud | G02B 6/4454 |
| | | | 385/135 |
| 7,410,308 B2 | 8/2008 | Qian et al. | |
| 8,687,934 B2* | 4/2014 | Wright | G02B 6/4442 |
| | | | 385/135 |
| 2003/0123834 A1* | 7/2003 | Burek | G02B 6/4471 |
| | | | 385/137 |
| 2009/0067804 A1* | 3/2009 | Knorr | G02B 6/4471 |
| | | | 385/137 |
| 2010/0111481 A1 | 5/2010 | Burek | |
| 2010/0150514 A1* | 6/2010 | Mohrmann | G02B 6/2558 |
| | | | 385/135 |

FOREIGN PATENT DOCUMENTS

| | | | | |
|---|---|---|---|---|
| DE | 4128040 C1 | * | 10/1992 | G02B 6/3801 |
| FR | 2743899 A1 | * | 7/1997 | G02B 6/4452 |
| JP | 10010336 A | * | 1/1998 | |
| JP | 2002090570 A | * | 3/2002 | |
| JP | 2003302534 A | * | 10/2003 | |

* cited by examiner

OPTICAL FIBER STRAND AND SPLICE SLEEVE RETENTION TOOL FOR USE DURING FIBER OPTIC CABLE SPLICING

CROSS-REFERENCE TO RELATED APPLICATIONS

This application claims the benefit of U.S. Provisional Patent Application No. 61/926,075, filed 10 Jan. 2014, and is a continuation in part of U.S. Nonprovisional patent application Ser. No. 13/974,621, filed 23 Aug. 2013, which claims priority to U.S. Provisional Patent Application No. 61/692,900, filed Aug. 24, 2012, the contents of each of which being full incorporated by reference herein.

TECHNICAL FIELD

The present invention relates generally to the design and configuration of mechanical devices, and more specifically to an optical fiber strand and splice sleeve holder and organizer for use during optical fiber cable splicing.

BACKGROUND OF THE INVENTION

The field of fiber optics has greatly expanded, largely in response to the constantly increasing demand for greater bandwidth in the telecommunications industry. New telecommunications pathways are created—and old ones replaced—as fiber optic lines are installed all over the world. This activity has led to a high demand for cable installation and maintenance services as optical fiber cables are increasingly preferred over copper and other analog telecommunications pathways.

Optical fiber cables are generally composed of one or more optical fibers, also referred to as simply "fibers" or "strands," and commonly carry many optical fibers. Each fiber consists of a transparent core, or bare fiber, through which optical data signal modes, or light signal modes, may travel. The manufacturing method and particular makeup of a core can vary amongst manufacturers and applications. Regardless, each fiber core acts as a waveguide for one (referred to as single-mode fibers) or more (referred to as multi-mode fibers) modes. The fiber core is coated in a protective optical cladding that, in conjunction with the fiber core, utilizes the effect of total internal reflection to confine light signals to the fiber core and transmit them along the fiber's axis.

The cladding is in turn coated in one or more buffer layers or protective coatings for increased protection from moisture and physical damage. In some applications, multiple fibers are contained within one or more buffer layers or coatings, while in other cases a plurality of fibers with buffer layers or coatings are contained within a larger buffer layer or coating. In both circumstances, the encased group of fibers is referred to as a fiber "tube," or "bundle." In most applications, multiple fiber bundles will be encased in at least one jacket layer as well, forming the complete optical fiber cable. Fiber cables in general may also contain various strengthening members, such as mesh sleeves or semi-rigid cores, as well as various coatings, buffer layers, and jackets depending on the specific characteristics required of a fiber cable for a particular application.

Generally, the most predominant forms of commercially available fiber cables come in one of two configurations. In the first configuration, the cable is composed of 12n fibers, where there are n number of fiber bundles each containing 12 fibers. These cables are often referred to as 12-strand tubes. The 12-strand tubes each are composed of 12 fibers wrapped in at least one buffer layer. A fiber cable utilizing n 12-strand tubes will therefore be comprised of 12n fibers.

Similarly, another somewhat common configuration utilizes 6-strand tubes wherein each tube contains six fibers. Therefore, a cable utilizing n 6-strand tubes will be comprised of a total of 6n fibers. While any configuration is possible, those utilizing one or more 6- and 12-strand conduits within the cable jacket are the most prevalent. Regardless of the configuration, fiber optic cables are comprised generally of fiber cores surrounded by a cladding layer, with one or more of such fibers coated with or sheathed in a protective buffer layer to form a fiber bundle. Covering one or more such fiber bundles with one or more protective jacket layers then forms a typical fiber optic cable. Optical fiber cables thus commonly have, for instance, 12, 24, 48, 96, 216, or 432 individual optical fibers, or other such combinations.

Two optical fiber cables must frequently be joined end-to-end to form a continuous optical waveguide. Cable splicing is performed, for example, when laying new optical fiber cables. Contiguous sections of optical fiber cable are joined together at their abutting, or proximal (relative to the joint), ends to form a continuous complete cable between their distal ends. Cable splicing can, for example, permit the installation of optical fiber over great distances and around obstacles and turns in the cable path.

During splicing activity in which two fiber optic cables are spliced together to form a continuous waveguide, a splice protector having a strengthening member is usually secured around the spliced joint to add strength and rigidity to the joint. The splice protector is sometimes referred to as a splice tube, a splice connection sleeve, a splice protection sleeve, or simply a splice sleeve. The strengthening member is often made of metal or alloy, but may also be made of plastic or other elastic or pliable material. It adds rigidity to the spliced joint in order to decrease the amount of potential flex that can occur at the interface of the proximal ends of the cable members when one member experiences movement relative to the other. Such movement exerts stress on the splice joint, potentially damaging the connection and reducing, impairing or terminating the ability of data signals to traverse the joint with minimal loss, attenuation or degradation. The strengthening member protects the integrity of the splice joint by absorbing unwanted forces and maintaining the positioning of the optical fiber proximal ends relative to one another.

Splice sleeves are normally comprised of an inner fiber tube, a strengthening member, and an outer shrink tube. The inner fiber tube is often made of a flexible, dielectric material and is the splice sleeve element through which the joined optical fibers pass. The outer shrink tube encompasses the inner fiber tube and strengthening member. The strengthening member is positioned between the exterior of the inner fiber tube and the interior of the outer shrink tube.

To splice the proximal ends of two contiguous optical fiber cables, it is common practice to strip the outer cable jackets and protective coatings to access the one or more fiber bundles. Each fiber bundle exterior is then stripped to gain access to the fibers themselves, if necessary, and cladding is removed from the cores. The fibers at the abutting end of one of the two contiguous cables are matched to the corresponding fibers at the abutting end of the other cable to form a fiber pair. One fiber in each fiber pair is threaded through a splice sleeve before the fiber pair is spliced together.

Each fiber pair is then prepped for splicing by cleaning the fiber, stripping the fiber cladding (if not previously done), and cleaving the ends of the fiber core. The fiber pair is then spliced together and the optical characteristics of the joint are tested to ensure that the splice was carried out successfully. Upon the confirmation that the splice has been completed successfully, the splice sleeve is positioned over the splice joint. Heat is applied to the splice sleeve to shrink or melt the outer shrink tube to the fiber, splice joint and other splice sleeve components.

The current methods of optical fiber cable splicing present several unsolved problems. As various fiber pairs are in the process of being prepped and spliced, natural movement and jostling of the fiber pair being attended to can often cause the remaining optical fibers in the bundle to shift and move about the workstation. This can have several negative consequences, such as the remaining fibers becoming tangled or broken. These fibers can also come into contact with substances present on the workstation, contaminating them and potentially causing undesirable optical characteristics, decreasing the longevity of the spliced joint, or it can simply create further cleaning work for the installers, increasing the installation time and cost. Substances used in the splicing process or from the interior of the optical fiber cables used to clear the interior of any moisture will often be present on the workstation surfaces and can contaminate stray fibers that have shifted out of position.

The problems caused by shifting fibers can also be magnified when one or more unsuccessful attempts are made when stripping or cleaving the fiber. Multiple attempts at stripping and cleaving can result in some fibers being shorter relative to the terminal ends of other fibers in the bundle. This can occur relatively between fiber bundles as well. Splicing a shortened pair will draw the longer pairs closer together and create slack in those corresponding fibers. This can exacerbate the problem of fibers becoming tangled, contaminated or broken due to movement.

The movement of the fibers as described above also poses a significant increase in the time expended when splicing two cables together. For example, for the fibers that have not yet been spliced to their corresponding match, such movement can cause the splicing sleeve that has been pre-threaded to slide off the fiber onto which it was placed. The splicing sleeve must then be retrieved, checked for contamination or discarded, and be placed back onto the fiber or replaced with a new splicing sleeve. This can occur several times over the course of the splicing activity for each fiber pair, leading to considerable decreases in productivity and increases in a project's material waste.

Furthermore, each joint must cool after the splice sleeve is heat shrunk around the joint for a cooling interval. The shrunken material exhibits adhesive characteristics before curing (i.e., cooling) occurs. Known systems and methods of splicing often result in many joints sticking to one another as the cables are spliced together, and can require undesirable forces to be applied to separate the individual joints prior to placement in the workstation retaining structures.

Therefore, given the current state of the art, there exists a need for an apparatus that may be used during splicing activities to organize fiber pairs and restrict their unwanted movement, while maintaining accessibility to those splicing fibers together. Such an apparatus would be helpful in increasing productivity and decreasing material waste and frustration while splicing and preventing contamination of the fibers, thereby negating unnecessary cleaning, retrieving, and rethreading actions.

BRIEF SUMMARY OF THE INVENTION

Exemplary embodiments of the present disclosure pertain to an apparatus for splicing an optical fiber cable using splice sleeves each having a length, an outer shrink tube and a rigid strengthening member within the outer shrink tube, that includes a base and a top half. The base includes a splice retaining portion and a permanent magnet inset into the base. The splice retaining portion may include a plurality of raised fins extending upwardly from a top surface of the base to a terminal end and together defining a plurality of splice channels, each of which has a lateral cross section sized to receive a splice sleeve. The top half is pivotally attached to the base, and includes a plurality of raised fins and a pliable insert inset into the top half and extending along a longitudinal section of each of the splice channels of the top half. The plurality of raised fins of the top half extend downwardly from a bottom surface thereof to define a plurality of splice channels complimentary to the plurality of splice channels of the splice retaining portion and aligned therewith when either the top half or the base is pivoted with respect to the other such that the bottom surface of the top half is substantially parallel to the top surface of the base. The splice channels may be configured as outwardly concave in shape.

A further aspect of the invention to provide for splice sleeve retention wherein the permanent magnet is insert into a longitudinal channel of the base. The longitudinal channel laterally intersects each of the plurality of splice channels therein. In some embodiments, the permanent magnet is secured therein with an adhesive. In some embodiments, the permanent magnet is secured therein by press-fit.

Some exemplary embodiments of the invention include a pliable insert, preferably made of a compressible and friction-resistant material. In some embodiments, the pliable insert is inset into a portion of the complimentary splice channels of the top half instead of the top half itself.

Some exemplary embodiments include at least one threaded boss inset into an exterior surface of the base or the top half, or both. A threaded boss may be inset into the bottom surface of the base, for instance, and provides a means for mounting the apparatus on a stand such as a tripod, panavise, or other similar devices.

In some embodiments, the base and top half are pivotally connected whereby each includes at least one hinge extension at an end thereof, and each hinge extension is pivotally coupled together to form a hinged connection between the base and the top half.

Another object of the invention is to provide a handle-held tool that provides advantages during fiber optic cable splicing activity, such as by improving the ease of threading a bare fiber into splice sleeves retained therein. In some embodiments, a bottom surface of the base and a top surface of the top half are formed to generally fit the contours of a human thumb and index finger, respectively, thereby provided increased ergonomic function to the apparatus. In some embodiments, one end of each of the splice channels of the splice retaining portion further includes a funnel portion having an opening that narrows from a diameter larger than the lateral cross section width to a diameter equal to the lateral cross section width of the splice channels. Some embodiments further or alternatively include such funnel portions at one end of each of the splice channels of the top half.

In yet other embodiments, the splice retaining portion is removable attached to the base. Furthermore, some of those exemplary embodiments may also include an installation means for retaining the splice retaining portion within an optical fiber tray assembly when installed therein.

Yet another object of the invention is to provide a means for visually matching fiber pairs by configuring the splice retaining portion with splice channel interior surfaces colored to correspond to each wavelength carried by the fibers in a bundle. This aspect may also be utilized on splice sleeves, or both the splice sleeves and channels may employ coloring to allow for quicker matching of the fibers during splicing.

These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Disclosed herein is a portable apparatus for organizing and retaining the optical fiber splice joints created when two or more optical fiber bundles are spliced together, and methods of using the same.

Figure 1:
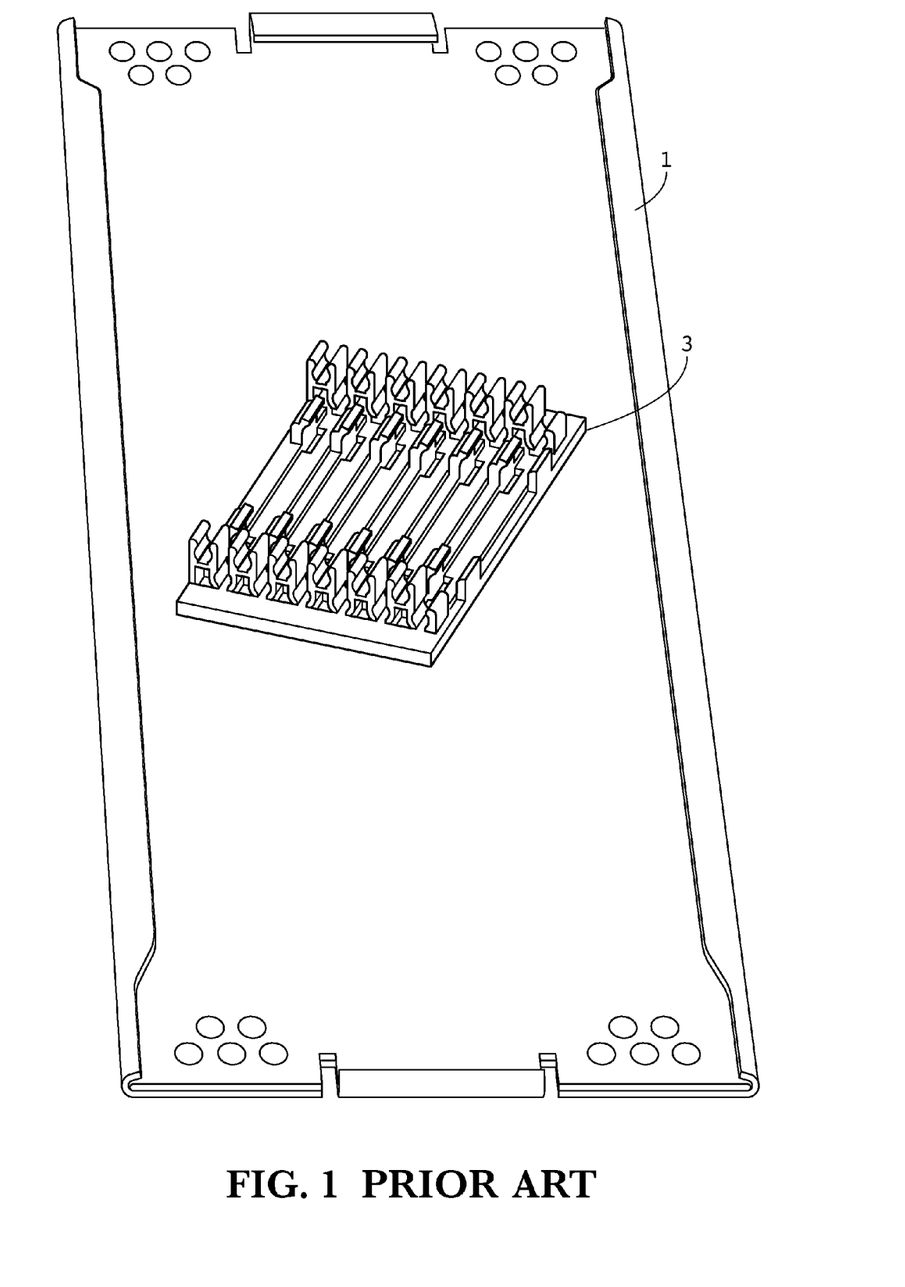
FIG. 1 depicts an elevated perspective view of a fiber optic cable splice tray.

FIG. 1 depicts a perspective view of generalized components of an optical fiber tray assembly used during cable splicing. At a worksite wherein two or more cables are to be joined together, an optical fiber tray assembly is permanently installed on site to house the joint sections of the fiber optic cables that have been spliced together. Optical fiber tray assemblies are often provided with multiple trays 1 into which abutting ends of at least one pair of cables to be spliced together run. Some optical fiber tray assemblies are further provided with a splice joint holder, such as that depicted at 3, affixed to an interior surface of the tray 1. Splice joint holders are provided to securely retain and protect the splice joints after cable splicing activity at a worksite is completed and closed. Currently known splice holders are typically plastic plates with inwardly biased retention clips to provide mechanical, semi-permanent retention of the joints while the cable is in service. These types of splice holders are configured for retention of the splice joints after splicing is complete, with repeated removal of the splice joint not being contemplated as an intended mode of use.

For example, the inwardly biased retention clips shown on the splice holder 3 require the application of a force to overcome the mechanical retention force. The stresses involved due to removal of splice joints from such prior art holders may result in damage to the splice joints. These splice holder configurations are thus undesirable for use during cable splicing activity, and are rather more useful as a holder only after all splicing steps have been completed.

Figure 2:
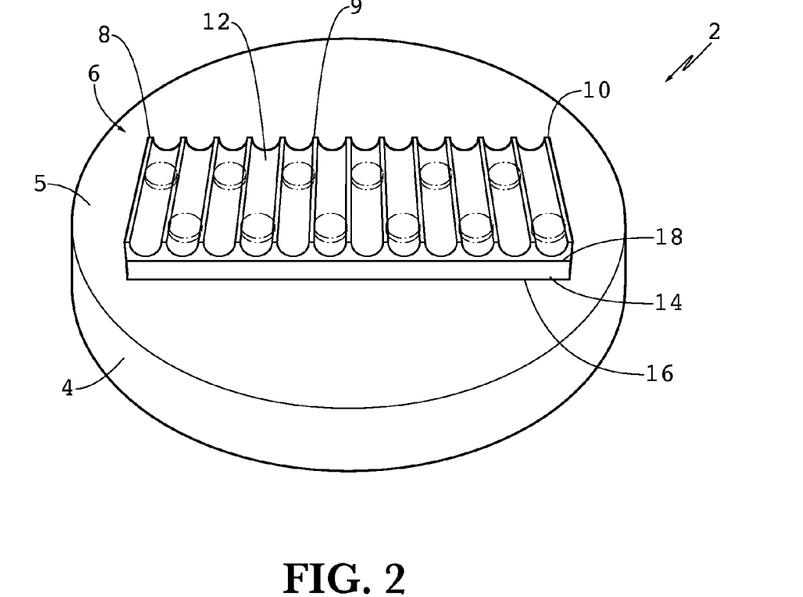
FIG. 2 depicts an elevated perspective view of a first exemplary embodiment of the invention.

FIG. 2 depicts an embodiment of a portable splicing tool, shown generally at 2. The splicing tool 2 has a base 4 and a splice retaining portion 6, shown here extending outwardly from the upper surface 5 of the base 4. The splice retaining portion 6 has a plurality of raised fins, such as those shown at 8-10, for example. The row of raised fins shown in FIG. 2 begin and end with lateral raised fins 8 and 10, which generally define the lateral bounds of the splice retaining portion 6. Other intermediary fins, such as fin 9, are equally spaced between the lateral fins.

The raised fins 8-10 extend outwardly as protrusions from the floor 14 of the splice retaining portion 6, and are generally coterminous in a horizontal plane. The coterminous ends of the fins are referred to herein as terminal ends. Together, successive raised fins define splice channels, such as the splice channel shown at 12. The exact shape of each protruded fin may vary depending upon the size, shape, and type of splice sleeves used during splicing, but will generally define a splice channel 12 extending longitudinally across the splice retaining portion 6 and sized to snugly receive the splice sleeve being used. A cross section taken through a lateral plane perpendicular to the longitudinal lengths of the splice channels and raised fins (e.g., extending to pass through lateral raised fins 8 and 10) defines a lateral cross sectional shape/size of the splice channel. The raised fins should be shaped so that a splice channel formed thereby is generally outwardly concave from the base in order to readily receive splice sleeves during splicing operations. In the preferred embodiment, the splice sleeves used are cylindrically shaped, and thus the splice channel formed is defined as a semicircular channel, as depicted at 12.

The floor 14 may vary in thickness depending on a particular application. It is secured on a bottom face to the base surface 5 as at 16. Likewise, the raised fins begin at the top of the floor and extend outwardly therefrom, as at raised fin base 18. Depending upon the method of manufacture, which is not considered limiting with regard to the current disclosure, the floor 14 may serve as the bottom surface of the splice channels with the raised fins being protrusions therefrom, or the raised fins may be manufactured as a separate unit and securely fastened to the floor. As shown in connection with FIG. 3, the latter method may be more useful when embedding magnets within the splice retaining portion. Alternatively the former method may be more useful as shown in connection with FIG. 4, in which magnets are embedded within the base, as explained in further detail below.

Figure 3:
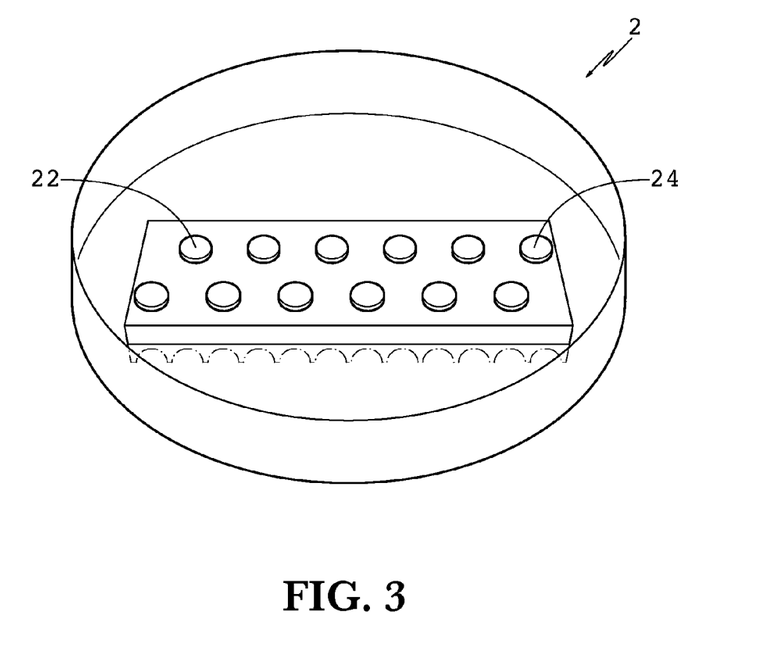
FIG. 3 depicts a lower perspective view of the embodiment shown in FIG. 1.

For the disclosure that follows, the exemplary embodiment depicted in FIGS. 2 and 3 is shown with a transparent base 4. Thus, the lower splice retaining portion 6 is visible through the base 4 in the lower perspective view shown in FIG. 3. The magnets, 22 and 24 discussed below are shown in phantom in FIG. 2 as they are inset in the splice retaining portion 6. The magnets' are visible in solid outline form in FIG. 3, however, due to the transparent nature of the base.

One of the most persistent problems currently facing persons engaged in optical fiber splicing is a result of movement and jostling of the many optical fibers present during splicing. Preferably, the base 4 is weighted to such an extent that it resists movement due to the combined forces exerted on it by fiber movement during splicing activity. For example, one of the 12 splice sleeves may be removed from the splicing tool in order to apply heat to the splice sleeve, thereby heat shrinking the tube. As explained above, the varying lengths of optical fibers, distance of the heat shrinking apparatus from the splicing location, and general jostling of the work area can often result in movement of the splicing joints. This can also occur during splicing. By securing the splicing sleeves within the splice channels during splicing and weighting the base 4, the movement of the optical fibers can be better controlled, increasing productivity and the quality of a splice, and decreasing material waste by protecting the bare fiber cores.

The use of a weighted base will tend to encourage individual splice sleeves to become unsecured from their splice channel due to forces exerted on it by the jostling or movement of the optical fiber threaded through it. Various means of removably securing the splice sleeves within the splice channels are thus provided. Turning to FIG. 3, a lower perspective view of the splicing tool 2 is shown. Permanent magnets, such as those shown at 22 and 24, may be embedded within the splice retaining portion and are positioned beneath, generally in close proximity to, and may form part of the splice channels. Because most splice sleeves utilize a strengthening member composed of ferromagnetic material, the use of embedded magnets can greatly enhance the ability of the tool to prevent damage to the spliced joints and contamination of the bare fiber during splicing by securing the splice sleeve in its channel. The size, shape, position and number of the magnet or magnets used will vary depending on the application and are not considered limiting, but should generally be applied to provide for a magnetic attraction between the magnet and the strengthening members in the splice sleeves sufficient in magnitude to prevent splice sleeve movement while being weak enough to easily detach a splice sleeve from the splice retaining portion when needed.

Figure 4:
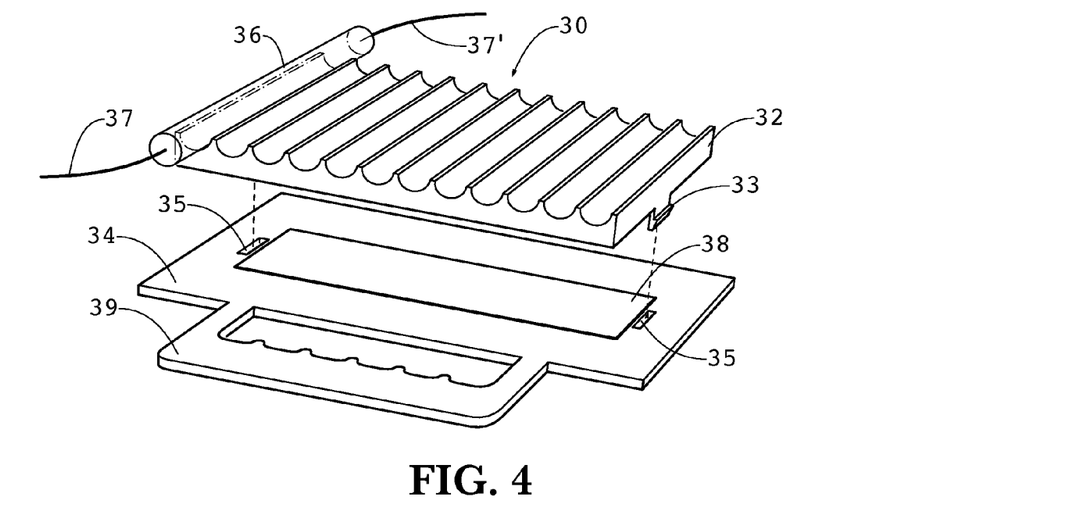
FIG. 4 depicts an elevated perspective view of a second exemplary embodiment of the invention in which the splice retaining portion is detachable from the base.

Turning to FIG. 4, a further aspect of the invention is shown in which the splice retaining portion 32 is removable from the base 34. Note that a splice sleeve 36 is shown secured within a splice channel as described but not illustrated in connection with FIG. 2. A fiber 37 from a first fiber bundle is shown spliced to its corresponding fiber 37' from a second fiber bundle, creating an optical fiber joint housed within the splice sleeve 36.

In the embodiment shown in connection with FIG. 4, the splice sleeve retention means is also embodied in the use of permanent magnets, as in FIGS. 2 and 3, the magnets being, however, alternatively secured to the base 34. This embodiment also depicts the alternative use of a single permanent magnet 38 configured as an bar inset into the base 34 and being elongate in the lateral direction. In this embodiment, the splice retaining portion 32 may be manufactured with less material having a relatively thinner floor and overall height than embodiments configured similarly to that shown in connection with FIGS. 2 and 3. This is desirable if the splice retaining portion 32 is made detachable to provide users with the option of leaving the spliced joints secured within the splice retaining portion 32 after splicing is complete. The splice retaining portion 32 is removed and secured within a typical splicing tray (such as the tray 1 of an optical fiber tray assembly shown in connection with FIG. 1), which houses one or more spliced cable pairs. In such an embodiment, the splice retaining portion 32 is left behind after splicing is complete. Therefore, the base 34 may be re-used, along with the magnets 38, reducing costs to the user over multiple splicing sessions and multiple locations using the tool 30.

The splice retaining portion 32 may have a means for installing the splice retaining portion 32 into an optical fiber tray assembly. The installation means may be separate or combined with a means for removably securing the splice retaining portion 32 to the base 34 in situations in which removability is desired, as depicted in connection with FIG. 4. For example, FIG. 4 depicts the use of lateral retaining clips that extend downwardly from the floor of the splice retaining portion 32. A first lateral retaining clip 33 is shown at a first lateral end of the splice retaining portion 32. A second lateral retaining clip is present, but not visible in that figure. The first and second lateral retaining clips may be used in combination to allow the splice retaining portion 32 to be installed into an optical fiber tray assembly (not shown) and as a removable attachment means with the base 34 view insertion into first and second retaining slots 35, respectively.

It should be noted also that additional elements may be provided in connection with reusable bases, such as the base 34 shown in connection with FIG. 4, in order to make the use of the device more convenient to the user. Ergonomic elements, such as handle 39, accessories, and other such additions may be provided as will be apparent to those skilled in the art, within departing from the teachings of the present disclosure.

Furthermore, those making or using the present invention should note that base 4 (FIG. 2) and base 34 (FIG. 4) vary with respect to shape and size. No particular shape and size has proven to be superior to another, and may vary depending upon application. Therefore, the spatial characteristics of the base are not considered particularly limiting for the purposes of this disclosure.

Figure 5:
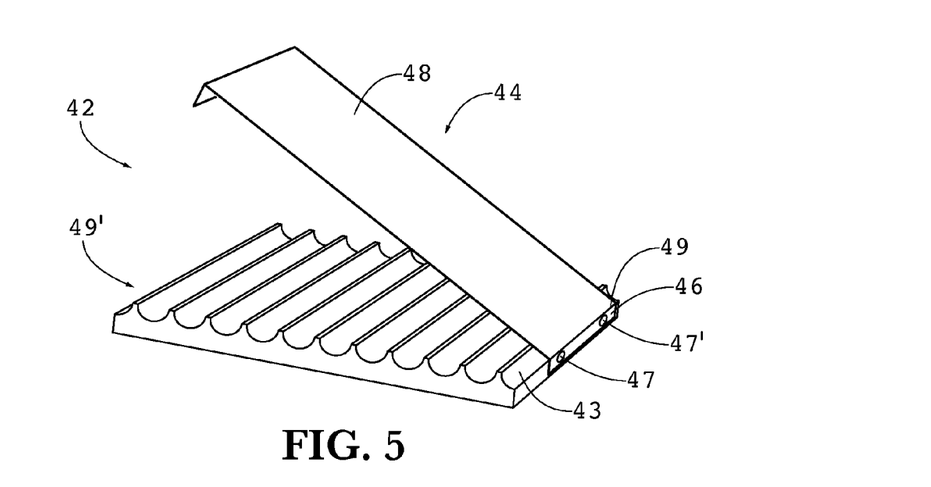
FIG. 5 depicts an elevated perspective view of a first exemplary embodiment of a splice retaining portion having a splice joint clamp.

An additional means of removably securing the splice sleeve to the splice retaining portion is depicted in connection with FIG. 5. FIG. 5 shows an alternative embodiment of a splice retaining portion 42 utilizing an optical fiber splice joint clamp 44. Such means may be applied to a splice retaining portion whether it is made detachable from the base or is permanently secured.

The joint clamp 44 is applied to provide a securing force to the splice sleeves by sitting flush with the terminal ends of the raised fins thereby covering a longitudinal section of the open portions of each splice channel and preventing splice sleeve movement. The joint clamp 44 might also contact the exposed surfaces of the splice sleeves if they extend above the terminal ends of the raised fins, providing a direct securing force on the splice sleeve directed into the splice channel. The clamping means need not necessarily extend longitudinally to cover the entire longitudinal length of a splice channel. Depending on the surface friction force characteristics, coverage of a smaller longitudinal section may be sufficient.

In the exemplary embodiment shown in connection with FIG. 5, a hinge support 46 is secured to a lateral edge 43 of the splice retaining portion 42, for example by counter sunk screws 47 and 47', an adhesive backing, or any other such method of attaching the same. Alternatively, the hinge support 46 may be secured to a lateral raised fin 43, or the base (the surface 5 of the base 4 shown in FIG. 2 for instance). The joint clamp 44 should be generally permanently or semi-permanently secured to a lateral face or edge of the splice retaining portion 42 if it is intended for the splice retaining portion to be installed in an optical fiber tray assembly after splicing is completed.

The hinge support 46 is pivotally connected to the proximal end of a clamping strip 48 via a hinge connection 49. The clamping strip 48 is pivotable about the hinge connection 49, and need not be a traditional hinge, but rather may be any type of pivotal connection, such as described in more detail in connection with FIG. 6, for instance. The clamping strip 48 may be rigid or pliable, so long as it provides a sufficient securing force to the splice sleeves within the splice channels. For example, the clamping strip 48 may be a rigid metal or plastic strip, or an elastic band.

The distal end of the clamping strip 48 is fastenable to the lateral edge or surface 49' that is opposite the edge or surface onto which the hinge support 46 is affixed. The method of fastening is not considered limiting and many options will be readily available to those skilled in the art. For example, a raised dimple on the end of a rigid clamping strip formed in the shape of an "L" may be mated with a receiving slot or depression on the corresponding lateral surface so that the clamping strip may be snapped into place while remaining easily removed by the user when needed. The clamping strip may use a hinged clasp, hook, or any other such means to removably fasten the distal end of the clamping strip to the splice retaining portion.

Figure 6:
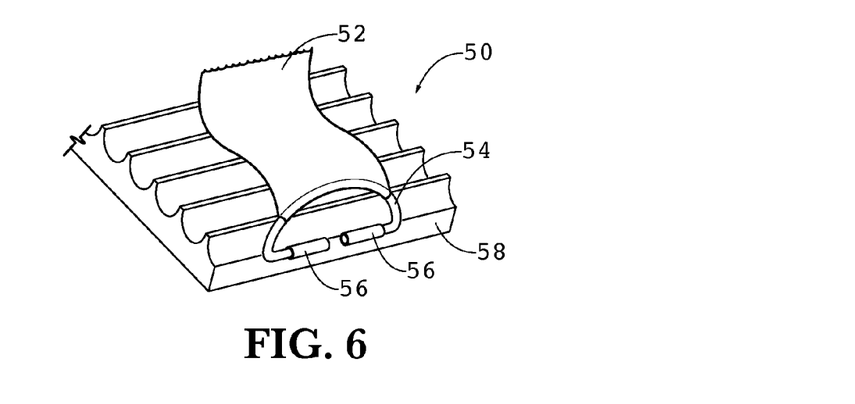
FIG. 6 depicts a cutaway elevated perspective view of a portion of a second exemplary embodiment of a splice retaining portion having a splice joint clamp.

Turning to FIG. 6, another embodiment of the joint clamp 50 is depicted generally. The embodiment utilizes an elastic nylon/fabric type band secured around a retaining ring 54. The retaining ring's 54 clip ends (not shown) are sheathed in retaining clips 56, which are in turn affixed to the splice retaining portion 58. As previously discussed, no particular method shown is meant to limit the extent of the disclosed invention, but are merely presented as illustrative embodiments.

Color coding may also be employed in connection with the apparatus to assist a user in tracking the identity of the individual fibers. For example, the splice sleeves employed can be provided in colored sets, with each splice sleeve being colored to correspond to a particular wavelength carried by the fibers in a bundle. Alternatively, the splice channel interior surfaces or exterior surfaces of the apparatus that are in close proximity to the splice channels may be colored in a like manner, or combinations of the splice sleeves, splice channels or apparatus exterior surfaces may employ coloring to allow for quicker matching of the fibers during splicing.

The methods of using the disclosed apparatus can alleviate the problems of tangled and contaminated optical fibers, reduce clutter, cost, and installation times, thereby significantly increasing productivity and the quality of optical fiber splices. The user first secures the splice sleeves into the splice channels by using magnetic force, closing a joint clamp, or a combination thereof. Then, the user strips and cleaves each optical fiber in a first fiber bundle and threads the bare fiber through a splice sleeve that is secured within a splice channel. Alternatively, the fibers may be threaded into their corresponding splice sleeves and then stripped and cleaved.

The joint clamp is then released, if applicable, and each splice sleeve is then removed, and the optical fiber contained therein is matched to its corresponding fiber in the second fiber bundle. During or before this process, each optical fiber in the second fiber bundle is then stripped and cleaved. Then the splicing process is performed. The splice sleeve is slid to position it over the splice joint and heat is applied to shrink the outer shrink tube around the joint. The splice joint is then placed back into its corresponding splice channel and the process is repeated for each optical fiber joint.

After splicing is complete, all of the spliced joints may be removed from the splice retaining portion and placed within the desired location at the install point. Alternatively, the joint clamp may be refastened, securing the optical fiber joints within the splice retaining portion, which may in turn be removed from the splicing tool base. If not joint clamp is used, the splice retaining portion is simply removed from its base. The splice retaining portion may then be secured within the active splicing tray by means such as applying an adhesive, securing clips clipped into the splicing tray, Velcro strips, or any other like means. Taking advantage of the removable aspect of the invention will allow for easy transfer, organization, and retention of optical fiber joints. As a result, the optical fiber joints will be handled less, reducing the chance that one or more joints may be damaged.

Figure 7:
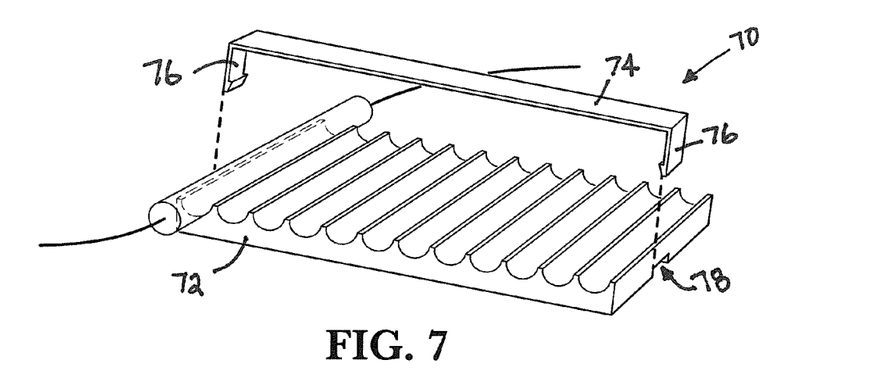
FIG. 7 depicts a perspective view of a third exemplary embodiment of a splice retaining portion having a splice joint clamp.

A further embodiment of an optical fiber splice joint clamp is depicted in perspective view in FIG. 7, wherein the clamping means 70 is a rigid strip placed over the splice retaining portion 72. The rigid strip 74 has lateral retaining clips 76 depending therefrom. The splice retaining portion 72 may be configured with retaining slots, such as retaining slot 78 visible in FIG. 7. Alternatively, the lateral retaining clips 76 may extend to be pressed into and retained by retaining slots present in the surface of a tray as seen in connection with FIG. 8.

Figure 8:
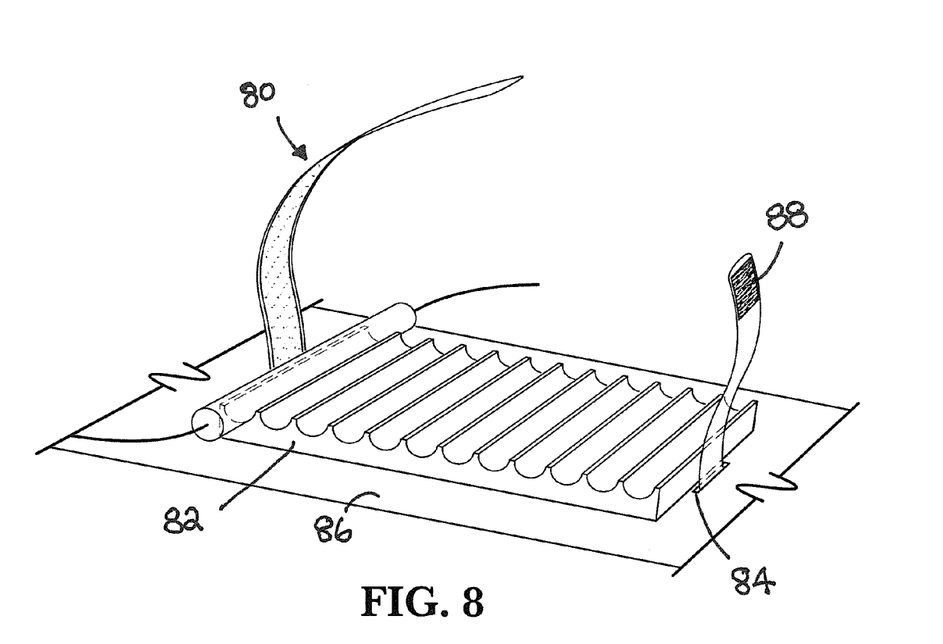
FIG. 8 depicts a perspective view of a fourth exemplary embodiment of a splice retaining portion having a splice joint clamp.

FIG. 8 is a perspective view of yet another embodiment of an optical fiber splice joint clamp for a splice retaining portion 82 wherein the clamping means 80 is a strap that may be threaded through retaining slots 84 in the tray surface 86. Alternatively, the strap may be secured around the splice retaining portion 82 only, before securing it to the tray. The strap may optionally be flexible, if desired, and has a securing means for securing together the ends of the strap. For instance, Velcro pads 88, snaps or any comparable and known method of securing together such ends may be used. Alternatively, the entire strap may be made of Velcro material, and the portion thereof covering the bottom of the splice retaining portion 82 used to secure the assembly to the tray surface 86.

Figure 9:
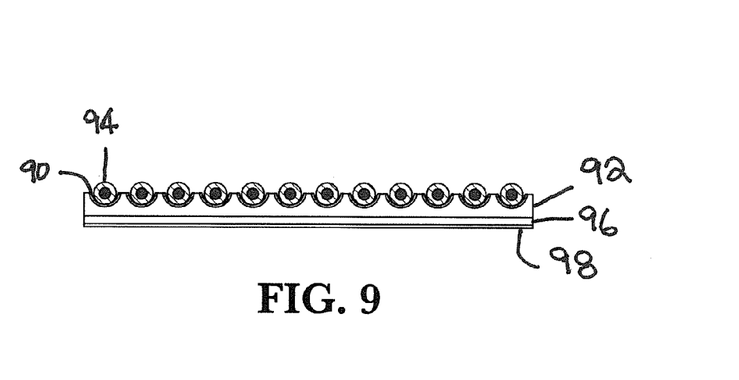
FIG. 9 depicts a side elevation view of a further exemplary embodiment of a means for removably securing the splice sleeves within the splice channels.

Further exemplary embodiments depicting means for removably securing the splice sleeves within the splice channels are depicted in connection with FIG. 9, which is an elevation view of an exemplary splice retaining portion 92 viewed from the front. The splice channels are depicted each carrying a splice sleeve 94. A thin coating of thermoplastic polymer 90 is applied to each splice sleeve channel (e.g., ethylene vinyl acetate). Immediately subsequent to the heat shrinking process that follows the splicing of a joint, the splice sleeve outer shrink tube material remains pliable for a cooling interval. Before the cooling interval is finished, the outer shrink tube material is sticky, and often causes problems during splicing. By coating the splice retaining portion 92, the splice sleeves may be returned to the splice retaining portion 92 to cool, and the heat dissipating from the sleeves raises the temperature of the coating so that a sufficiently strong but non-permanent bond is created between the splice sleeve 94 and the splice channel through the coating 90. Such embodiments may be further provided with an optional adhesion pad 96 with a peelable protective cover 98 that is removed before placing the splice retaining portion 92 within the tray.

Figure 10:
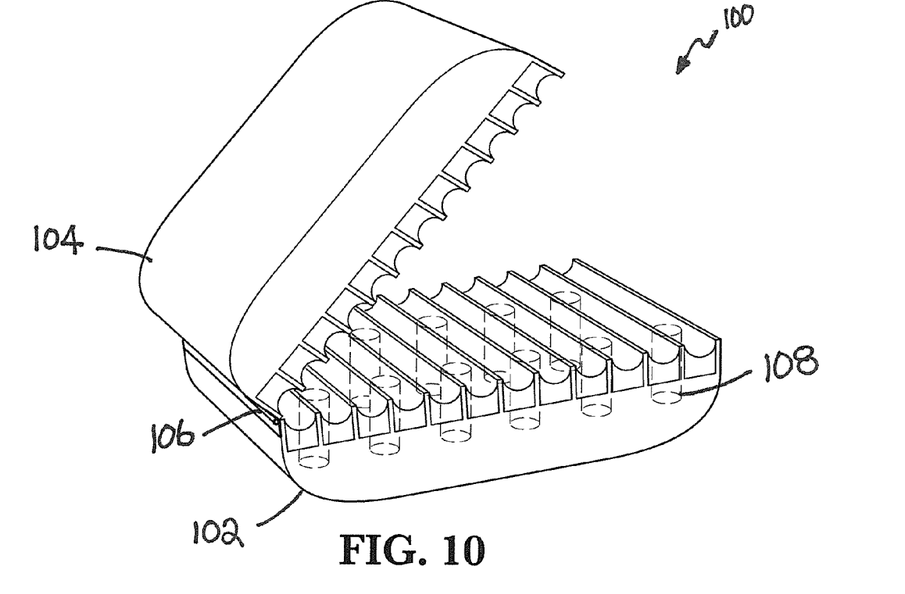
FIG. 10 depicts a perspective view of a further exemplary embodiment of an apparatus used in fiber optic cable splicing activities.
Figure 11:
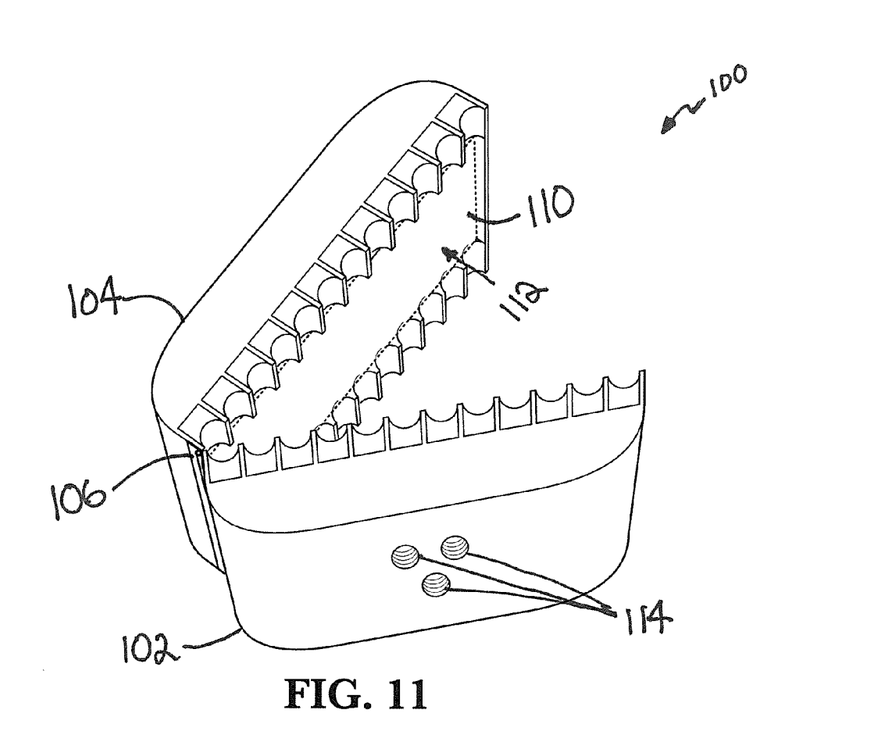
FIG. 11 depicts a further perspective view of thereof.

Turning to FIGS. 10-11, an additional embodiment of the apparatus 100 is depicted in perspective view. The base 102 is pivotally connected to an additional means 104 for removably securing the splice sleeve to the splice retaining portion. The means 104 for removably securing the splice sleeve to the splice retaining portion is a top half of a clam-type configuration and is connected to the base 102 by a hinge of any suitable type, such as but not limited to a piano hinge 106 depicted in FIGS. 10-11 or interlocking extensions of the top half and bottom half of the apparatus to be combined with a rivet or hinge axle. The dotted outlines depict the use of embedded internal magnets 108 as an additional or alternative means for removably securing the splice sleeve to the splice retaining portion.

In FIG. 11 there is depicted an optional pliable insert 110 that is inset into the top half 104 of the apparatus 100 so that the inner surface of the insert contacts the splice sleeves (not shown) when the two halves 102 and 104 are pressed together. The insert extends along at least a longitudinal section of the open portions of each splice channel and should generally provide friction resistance at an inner surface 112 to constrain splice sleeve movement in the channels. The insert 110 is preferably made of a polyurethane foam or other known alternatives. Also depicted in FIG. 11 is the optional use of one or more inset threaded bosses 114 in the bottom of the base half as an attachment or mounting means for the apparatus.

Figure 12:
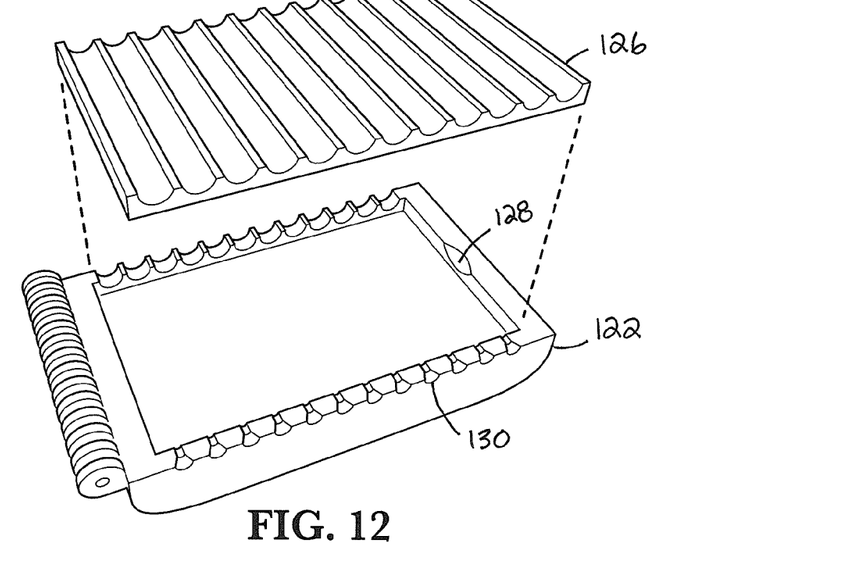
FIG. 12 depicts a perspective view of a base of a further exemplary embodiment of an apparatus user in fiber optic cable splicing activities wherein the splice retaining portion is removable.

FIG. 12 is an alternative embodiment of the base 122 half wherein the splice retaining portion 126 is removable from a recess. A finger scoop 128 is shown as an exemplary manner by which a splice retaining portion 126 may be removed from the apparatus. Alternatively, as previously discussed herein, the splice retaining portion 126 may be securable to the base using a variety of methods.

Figure 13A:
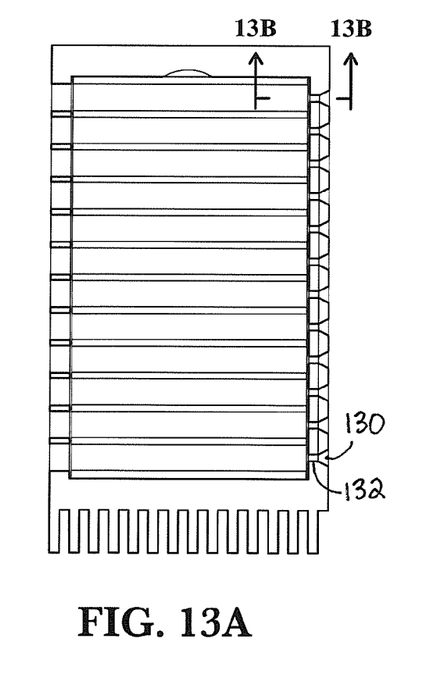
FIG. 13A depicts a top plan view thereof.
Figure 13B:
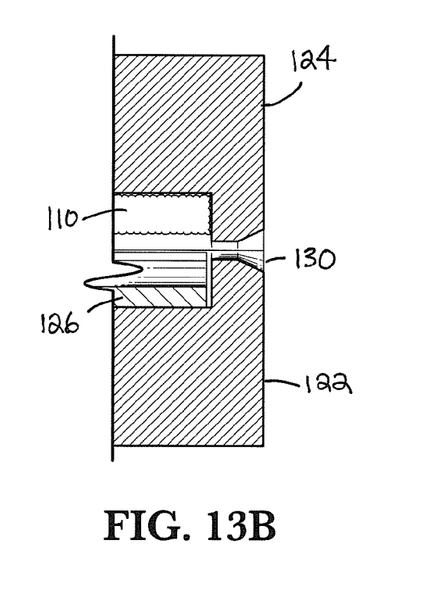
FIG. 13B depicts a side elevation sectional view thereof.

In FIGS. 12, 13A and 13B, both the top 124 and bottom 122 halves of the apparatus (i.e., the base 122 and means 124 for removably securing the splice sleeves in the splice retaining portion) are provided with means 130 for guiding a fiber core into the inner fiber tube of a splice sleeve. For example, FIG. 12 has a plurality of half funnel portions that lead into a fiber channel 132 having a smaller overall width or diameter than the splice channels. When combined with the other corresponding half on a top half of the apparatus (see in FIG. 13B), a funnel is formed that greatly improves the speed and success rate of a threading attempt when threading a fiber core through a shrink tube in preparation of splicing.

FIG. 13A is a top view of the bottom half, and FIG. 13B is a sectional view taken at 13B in FIG. 13A. The sectional view of FIG. 13B includes the top half of the apparatus, which incorporates the optional pliable insert 110 inset therein. The removable splice retaining portion that may be inserted into and left in the tray (not shown) after splicing is shown as well.

Figure 14:
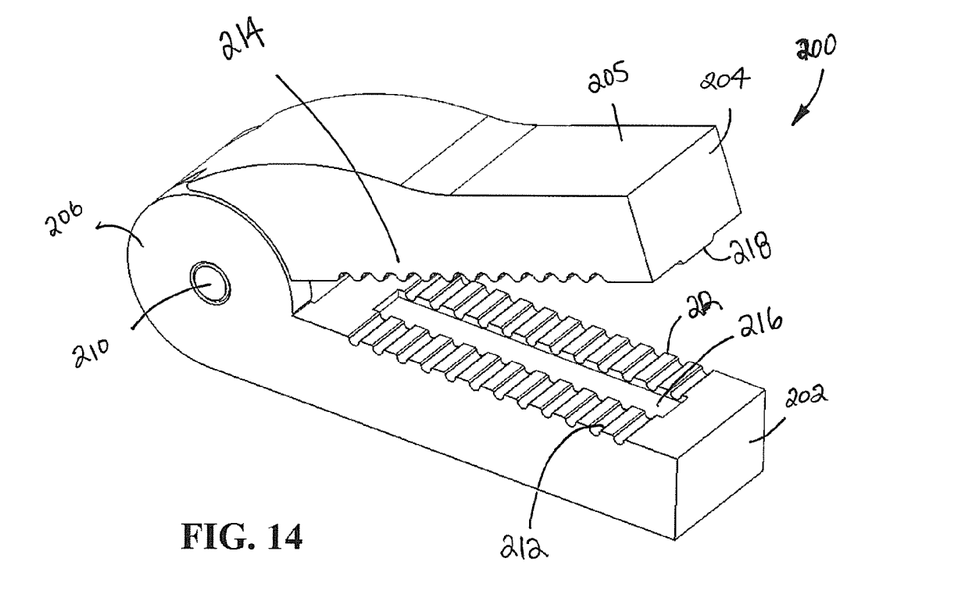
FIG. 14 depicts a perspective view of a further exemplary embodiment of an apparatus user in fiber optic cable splicing activities.
Figure 15:
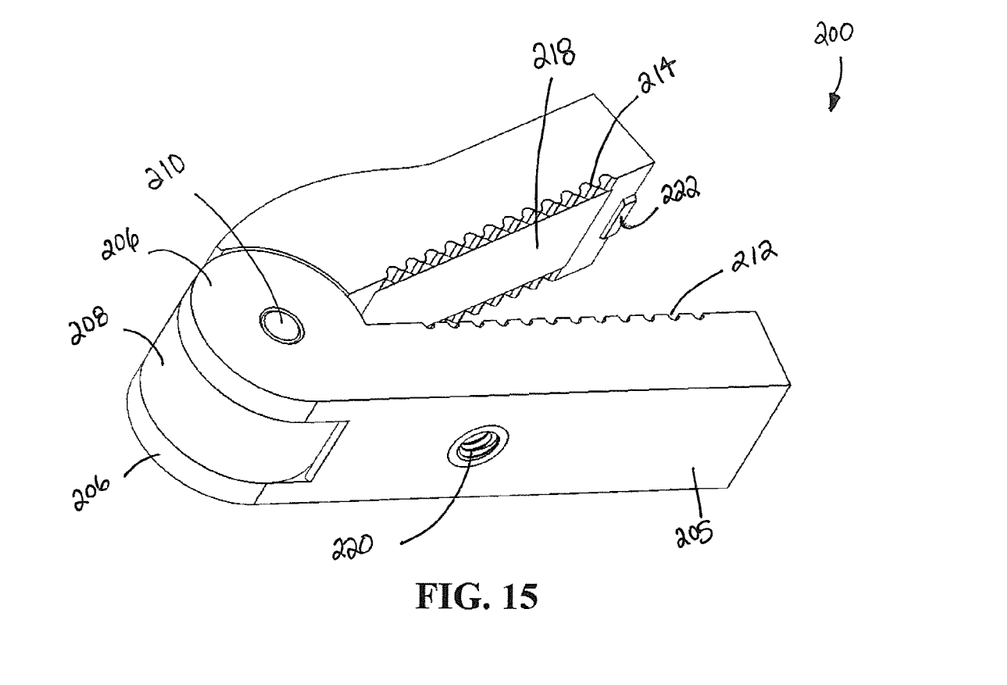
FIG. 15 depicts a further perspective view thereof.
Figure 16:
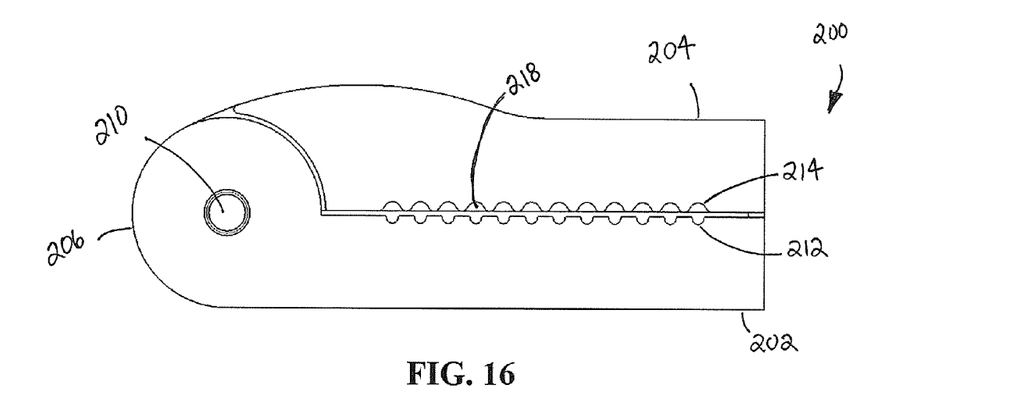
FIG. 16 depicts a side elevation view thereof.
Figure 17:
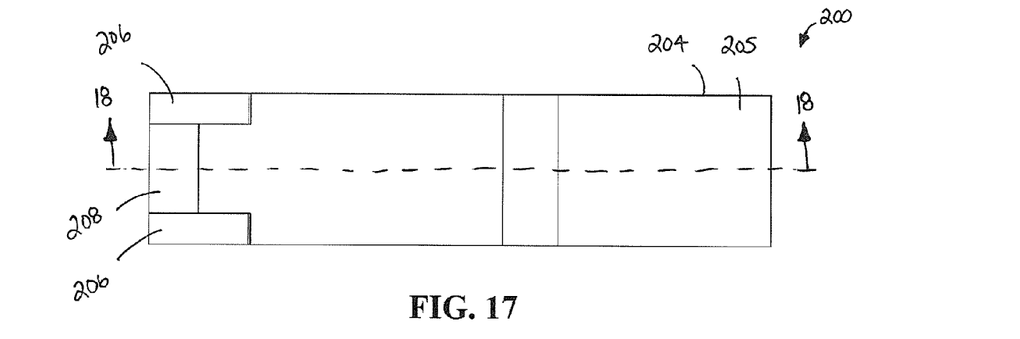
FIG. 17 depicts a top plan view thereof.
Figure 18:
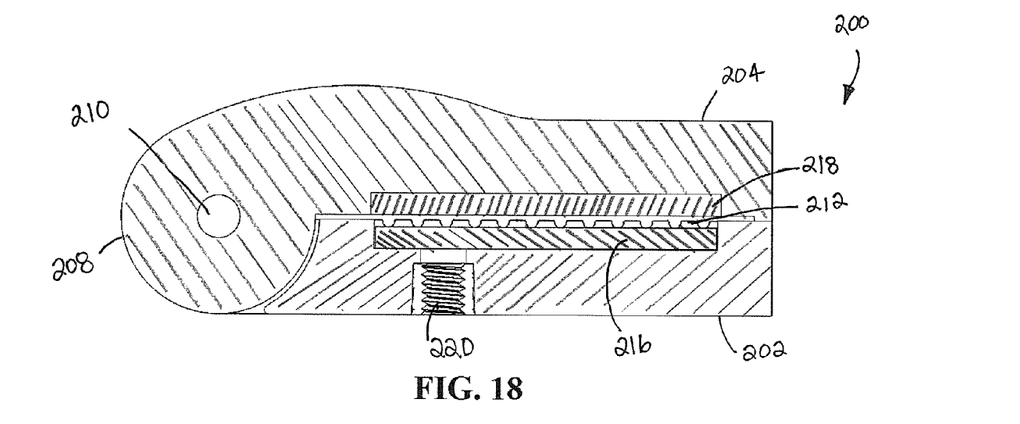
FIG. 18 depicts a side section view thereof taken at line 18-18 of FIG. 17.

Turning to FIGS. 14-18, a further exemplary embodiment of an apparatus 200 according to the present invention is shown in front and back perspective views, respectively, in FIGS. 14-15, a side elevation view in FIG. 16, a top plan view in FIG. 17, and a side section view in FIG. 18. Similar to the previous embodiment described, the apparatus 200 includes a base 202 and a top half 204 pivotally connected to one another. Preferably, the apparatus 200 is provided with at least two surfaces 205 shaped to be comfortably gripped between the thumb and one or more fingers of the hand of a user. It has been found that this particular method of using the apparatus 200 is ergonomically effective, as it provides exemplary control and improved hand-eye coordination while threading bare fiber into splice sleeves retained therein.

As previously described, those skilled in the art will appreciate that several hinge mechanisms may be utilized without departing from the scope of the present invention herein. However, optional embodiments of the apparatus include at least one hinge extension protruding from one end of the apparatus. For example, the base 202 may be configured with two laterally-spaced hinge extensions 206, and the top half 204 may be configured with a centrally-position hinge extension 208, adapted so that the hinge extension 208 of the top half 204 fits within the hinge extensions 206 of the base 202. A rivet 210, hinge axel or other such component may then be used to pivotally coupled the base 202 and top half 204 thereat.

This embodiment further includes a splice retaining portion 212 extending upwardly from a top surface of the base 202, and a set of complimentary splice channels 214 extending downwardly from a bottom surface of the top half 204. These surfaces face each other, and come to rest generally parallel to one another when the apparatus 200 is in the closed position, as shown in connection with FIGS. 16-18, for example. In this embodiment, a permanent magnet 216 is shown inset into the base 202, although a plurality of magnets may be used as well, as previously described herein.

A pliable insert 218 is also present in this embodiment of the apparatus 200, shown in FIG. 15, for instance. The insert 218 is preferably compressible and provides significant friction resistance in at least the lateral direction of the apparatus 200, in order to provide additional retention forces to maintain the position of the splice sleeves utilized therein during splicing activity. In some embodiments, a rubber or rubber/foam material is used, and the insert 218 is inset into the top half 204 such that at least a longitudinal portion, or section, of the splice channels 214 of the top half 204 include the insert 218. Note that FIGS. 16 and 18 illustrate that the pliable insert 218 is shown generally extending to the splice channels 214 when viewed from the side, and that it is preferable for the pliable insert to be at least coterminous with the lower ends of the splice channels 214, illustrated by the fact that the splice channels are not visible in the cross section shown in FIG. 18.

Preferred embodiments, such as the apparatus 200, may also be configured with one or more threaded bosses 220 inset into at least one of the base or top half. In this embodiment shown in FIGS. 14-18, the boss 220 is inset into the base 202, however those skilled in the art will appreciate that the top half may also or alternatively be adapted with one or more threaded bosses as well. This embodiment also exhibits the use of an optional spacer portion 222 at an end opposite the hinged ends of the base and top half, in order to provide a predetermined gap between the complimentary and coacting surfaces of the base and top half elements, and to protect the fiber and splice sleeves from excessive compression forces that may be applied by the user from time to time.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An apparatus for splicing an optical fiber cable using splice sleeves each having a length, an outer shrink tube and a rigid strengthening member within the outer shrink tube, the apparatus comprising:
    a base comprising:
        a splice retaining portion comprising a plurality of raised fins extending upwardly from a top surface of the base to a terminal end and together defining a plurality of splice channels, each of which has a lateral cross section sized to receive a splice sleeve; and
        a permanent magnet inset into the base; and
    a top half pivotally attached to the base, the top half comprising:
        a plurality of raised fins extending downwardly from a bottom surface of the top half to define a plurality of splice channels complimentary to the plurality of splice channels of the splice retaining portion and aligned therewith when either the top half or the base is pivoted with respect to the other such that the bottom surface of the top half is substantially parallel to the top surface of the base; and
        a pliable insert inset into the top half and extending along a longitudinal section of each of the splice channels of the top half.

2. The apparatus of claim 1, wherein each of the splice channels in the plurality of splice channels is outwardly concave.

3. The apparatus of claim 2, wherein one end of each of the splice channels of the splice retaining portion further comprises a funnel portion having an opening that narrows from a diameter larger than the lateral cross section width to a diameter equal to the lateral cross section width.

4. The apparatus of claim 2, wherein one end of each of the splice channels of the top half further comprises a funnel portion having an opening that narrows from a diameter larger than the lateral cross section width to a diameter equal to the lateral cross section width.

5. The apparatus of claim 1, wherein the permanent magnet is inset into a longitudinal channel of the base that laterally intersects each of the plurality of splice channels therein.

6. The apparatus of claim 5, wherein the permanent magnet is secured within the longitudinal channel of the base with an adhesive.

7. The apparatus of claim 1, wherein the pliable insert is made of a compressible and friction-resistant material.

8. The apparatus of claim 1, wherein the base further comprises at least one threaded boss inset into a bottom surface of the base.

9. The apparatus of claim 1, wherein the base and the top half each further comprise at least one hinge extension at an end thereof, each hinge extension being pivotally coupled together to form a hinged connection between the base and the top half.

10. The apparatus of claim 1, wherein a bottom surface of the base and a top surface of the top half are formed to fit the contours of a human thumb and index finger, respectively.

11. The apparatus of claim 1, wherein the splice retaining portion is removably attached to the base.

12. The apparatus of claim 11, wherein the splice retaining portion further comprises an installation means for retaining the splice retaining portion within an optical fiber tray assembly when installed therein.

* * * * *